(12) United States Patent
Wobben

(10) Patent No.: US 7,874,165 B2
(45) Date of Patent: Jan. 25, 2011

(54) WIND POWER INSTALLATION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 439 days.

(21) Appl. No.: 12/004,934

(22) Filed: Dec. 20, 2007

(65) Prior Publication Data

US 2008/0124213 A1    May 29, 2008

Related U.S. Application Data

(62) Division of application No. 10/486,617, filed as application No. PCT/EP02/07225 on Jul. 1, 2002, now abandoned.

(30) Foreign Application Priority Data

Aug. 10, 2001   (DE)   ................. 101 39 556

(51) Int. Cl.
    *F25B 21/02*   (2006.01)
(52) U.S. Cl. ....................................... 62/3.4
(58) Field of Classification Search ............... 62/3.4, 62/3.2, 176.1; 415/121.3
    See application file for complete search history.

(56) References Cited

U.S. PATENT DOCUMENTS

| | | | |
|---|---|---|---|
| 3,552,133 A | 1/1971 | Lukomsky et al. | 62/3 |
| 3,956,902 A | 5/1976 | Fields, Jr. | 62/3 |
| 5,071,027 A | 12/1991 | Sullivan | 220/571 |
| 5,375,421 A | 12/1994 | Hsieh | 62/3.4 |
| 5,555,732 A | 9/1996 | Whiticar | 62/3.4 |
| 5,884,486 A | 3/1999 | Hughes et al. | 62/3.4 |
| 5,890,371 A | 4/1999 | Rajasubramanian et al. | 62/259.2 |
| 5,992,154 A | 11/1999 | Kawada et al. | 62/3.4 |
| 6,101,815 A | 8/2000 | van Oort et al. | 62/3.4 |
| 6,250,083 B1 * | 6/2001 | Chou | 62/3.4 |
| 6,378,311 B1 | 4/2002 | McCordic | 62/3.4 |
| 6,439,832 B1 | 8/2002 | Siegfriedsen | 415/4.3 |
| 6,676,122 B1 | 1/2004 | Wobben | 270/55 |
| 7,161,260 B2 | 1/2007 | Kruger-Gotzmann et al. | |
| 7,168,251 B1 | 1/2007 | Janssen | |
| 2002/0124574 A1 * | 9/2002 | Guttman et al. | 62/3.3 |

FOREIGN PATENT DOCUMENTS

| | | |
|---|---|---|
| DE | 1 189 250 | 3/1965 |
| DE | 92 10 970.5 | 1/1993 |
| DE | 44 23 851 | 8/1995 |
| DE | 19859628 | 3/2000 |

(Continued)

*Primary Examiner*—Melvin Jones
(74) *Attorney, Agent, or Firm*—Seed IP Law Group PLLC

(57) ABSTRACT

An apparatus is provided including a generator, at least two rotor blades coupled to the generator, a pylon, and electrical equipment configured to receive electrical power generated by the generator and located within an internal space of the pylon. The apparatus further includes a dehumidification device adjacent the electrical equipment, the dehumidification device having a first element, a heat transfer element coupled to the first element and configured to remove heat from the first element, and a second element coupled to the heat transfer element and to a wall of the pylon. The second element is configured to receive the heat removed from the first element. The apparatus may include a deflecting structure configured to deflect cooled air toward the second element for extracting the heat received by the second element.

21 Claims, 6 Drawing Sheets

FOREIGN PATENT DOCUMENTS

| | | |
|---|---|---|
| DE | 199 47 915 A1 | 4/2001 |
| DE | 100 00 370 A1 | 7/2001 |
| DE | 100 16 913 A1 | 10/2001 |
| DE | 60029977 T2 | 3/2007 |
| EP | 0 078 932 A1 | 5/1983 |
| EP | 0 758 730 A2 | 2/1997 |
| JP | 7-133940 | 5/1995 |
| JP | 7-236810 | 9/1995 |
| JP | 7-280283 | 10/1995 |
| JP | 10-118442 | 5/1998 |
| JP | 10-165746 | 6/1998 |
| JP | 2001-174024 | 6/2001 |
| WO | WO 99/11927 | 3/1999 |
| WO | WO 99/30031 | 6/1999 |
| WO | WO 01/21956 A1 | 3/2001 |

\* cited by examiner

WIND POWER INSTALLATION

CROSS-REFERENCE TO RELATED APPLICATION

This application is a divisional of U.S. patent application Ser. No. 10/486,617, filed Sep. 8, 2004, now pending, which application is incorporated herein by reference in its entirety.

BACKGROUND

1. Technical Field

The present invention concerns a wind power installation, in particular a wind power installation having an apparatus for dehumidifying a gaseous medium in a substantially closed space within the wind power installation.

2. Description of the Related Art

A dehumidifying apparatus operating on a chemical basis has long been known. In that known apparatus moisture is removed from the ambient air chemically and the moisture is collected in a catch container. That known apparatus however suffers from the disadvantage that the chemical has to be replaced at certain time intervals in order to maintain proper operability of the apparatus. In relation to a large number of apparatuses which are to be centrally monitored and maintained, that requires additional-expenditure in terms of personnel and logistics.

Dehumidifiers are also known, in which an enclosed space is cooled on the basis of the operative principle of a refrigerator by way of a compressor/evaporator unit by means of a coolant specifically provided for that purpose, in order in that way to remove moisture from the air contained in that space.

With those apparatuses however the structure is complicated and expensive and in addition it is necessary for the cooling fluid to be collected separately upon disposal.

BRIEF SUMMARY

Therefore the object of the present invention is to develop a wind power installation and in particular to design a wind power installation in such a way that moisture problems within the wind power installation can be eliminated in a simple manner.

That object is attained by a wind power installation having the features of claim 1. Advantageous developments are set forth in the appendant claims. In the wind power installation according to the invention the object is attained by a first flat or air exposed element and a cooling device for cooling the element to a temperature below the ambient temperature (room temperature). At that ambient temperature a part of the moisture contained in the air condenses at the surface of the first element. That moisture is removed from the ambient air in that way and can be drained off.

In order to permit maintenance-free long-term operation the cooling device is preferably a Peltier element or a group of Peltier elements which withdraw heat from the first element and thereby cool that element. The heat which is withdrawn from the first element is discharged to the ambient atmosphere again by way of a second element.

In order to achieve a particularly good effect the second element can be connected to a wall delimiting the space to be dehumidified or can even be formed by that wall.

The condensate water can be discharged into the open through a duct and a wall opening. In that case the wall opening can preferably be provided in the region of the ground in order to avoid traces of dripping water on outside walls.

In order to prevent the condensate water from uncontrolledly dripping down within the space in the event of a blockage of the duct for draining off the condensate water, it is possible to provide a container which catches those drips. Thus the container can be emptied in the context of an inspection procedure or after signalling from a sensor suitably arranged in the container. At the same time the closure of the duct can be removed so that the condensate water is again automatically removed from the space.

In a particularly preferred development of the invention there is provided a first temperature sensor for detecting the temperature of the first element and a second temperature sensor for detecting the ambient temperature. The apparatus according to the invention can be controlled by means of those sensors and a control device connected on the output side thereof, in such a way that the first element is always at a predeterminable temperature difference with respect to the ambient temperature. A constant dehumidification output can be achieved in that way.

Advantageous embodiments are recited in the appendant claims.

Room air dehumidifiers are already known from DE-U-92 10 970.5, DE 44 23 851, German patent specification No 1 189 250, EP 0 758 730 A2 and U.S. Pat. No. 5,071,027. The use of such room air dehumidifiers within wind power installations has hitherto not been proposed.

BRIEF DESCRIPTION OF THE SEVERAL VIEWS OF THE DRAWING(S)

An embodiment of the invention is described in greater detail hereinafter with reference to the drawings in which.

DETAILED DESCRIPTION

Figure 1:
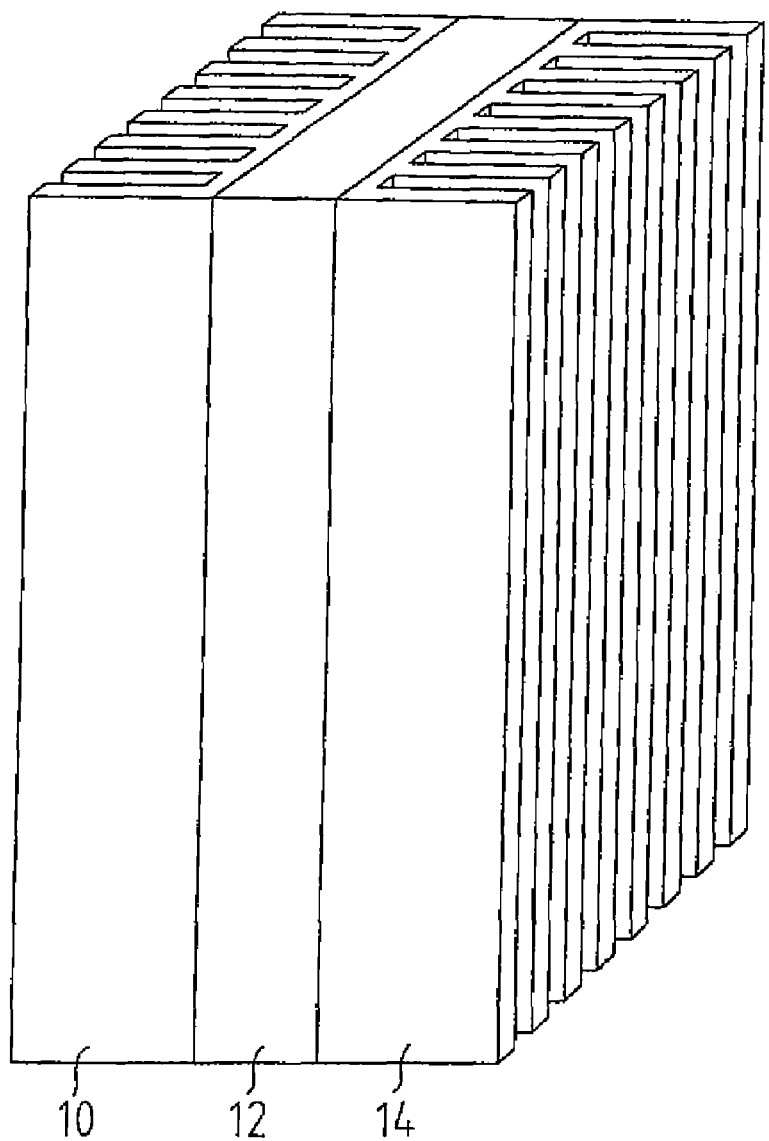
FIG. 1 shows a perspective view of an apparatus according to the invention.

Referring to FIG. 1 shown therein is a side view of an apparatus according to the invention. Disposed between a first element 10 and a second element 14 is a cooling device 12. The cooling device 12 is a Peltier element operated with electrical power or a group of Peltier elements. It causes transportation of heat from a lateral boundary surface to the other—in this case the heat is transported from the first element 10 to the second element 14.

If the cooling device 12 is acted upon by a suitable current which is predetermined in respect of amount and direction, heat is withdrawn from the first element 10 and transported to the second element 14 where it is in turn discharged to the ambient atmosphere. The first element 10 and the second element 14 are preferably in the form of cooling bodies, that is to say flat or air exposed aluminum elements with cooling ribs extending thereon for increasing the effective surface area.

Due to the extraction of heat the first element 10 cools down to below the ambient temperature and the moisture contained in the ambient air condenses at the element 10.

As the surface area-increasing cooling ribs of the first element 10 extend vertically, the condensate water can easily drain away downwardly due to the effect of the force of gravity and can be suitably collected up and if necessary drained off by means of conduits.

Figure 2:
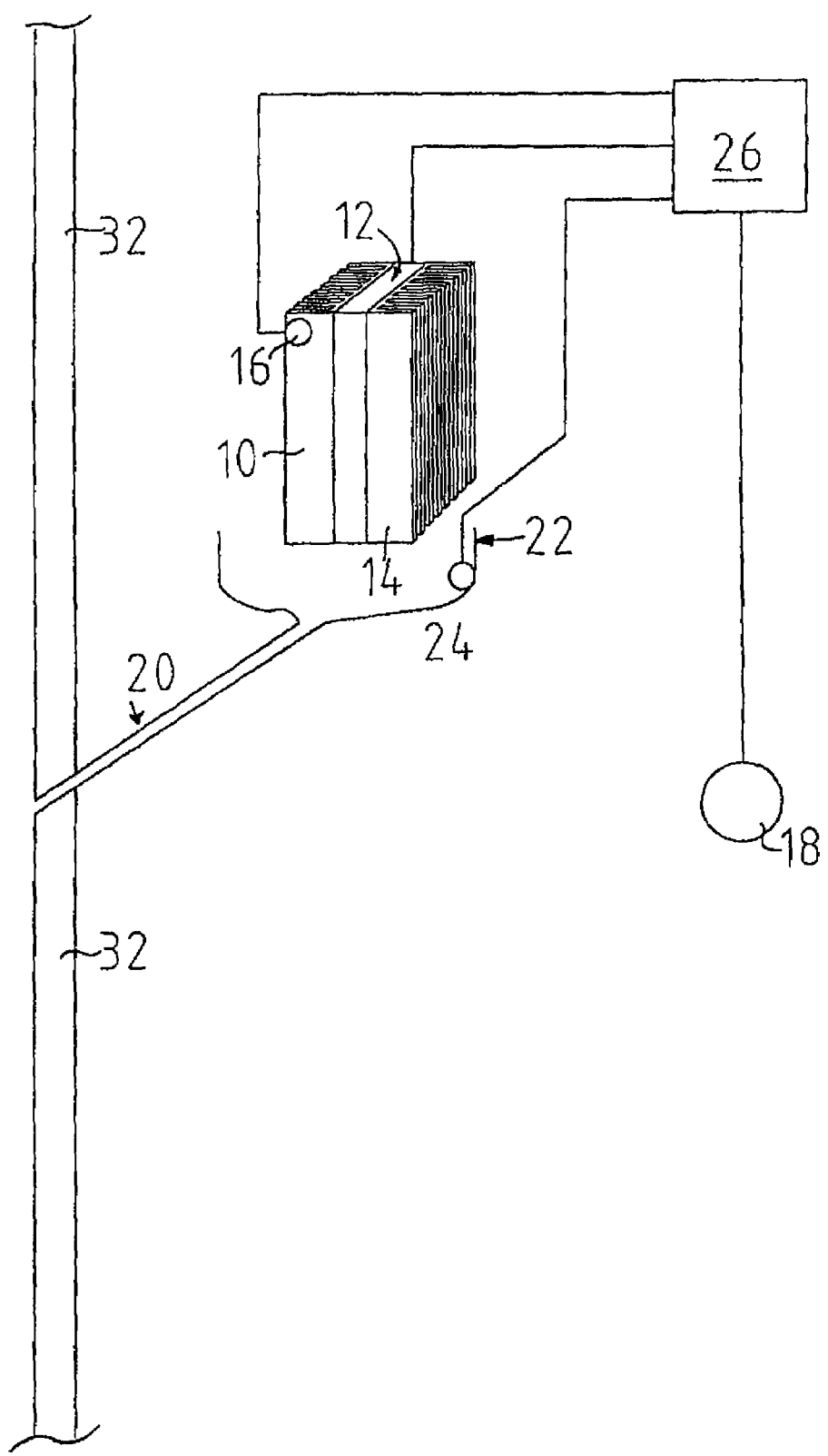
FIG. 2 shows a further view of the apparatus according to the invention.

It can be seen from the side view in FIG. 2 that the condensate water which drains off downwardly along the cooling ribs of the first element 10 passes into a duct 20 which is passed into the open air through a wall 32 so that the condensate water can drain off into the open without any problem.

If that duct 20 should suffer from a blockage, there is additionally provided a catch space 22 which can store the condensate water so that it does not drip uncontrolledly into regions below the apparatus. Provided in that catch space 22 is a liquid sensor 24 which can detect a rise in the level of liquid and trigger a suitable signal which for example can be used to cause maintenance personnel to remove the closure of the duct 20 and empty the catch space.

The apparatus has a control device 26 in order to detect the temperature of the first element 10 by way of a first temperature sensor 16. The ambient temperature is detected by way of a second temperature sensor 18. The control device 26 can then derive the required control effect for the cooling device 12, from the temperature difference and predetermined reference values. It will be appreciated that this control system can also monitor the liquid sensor 24 and produce and output the corresponding signals.

Figure 3:
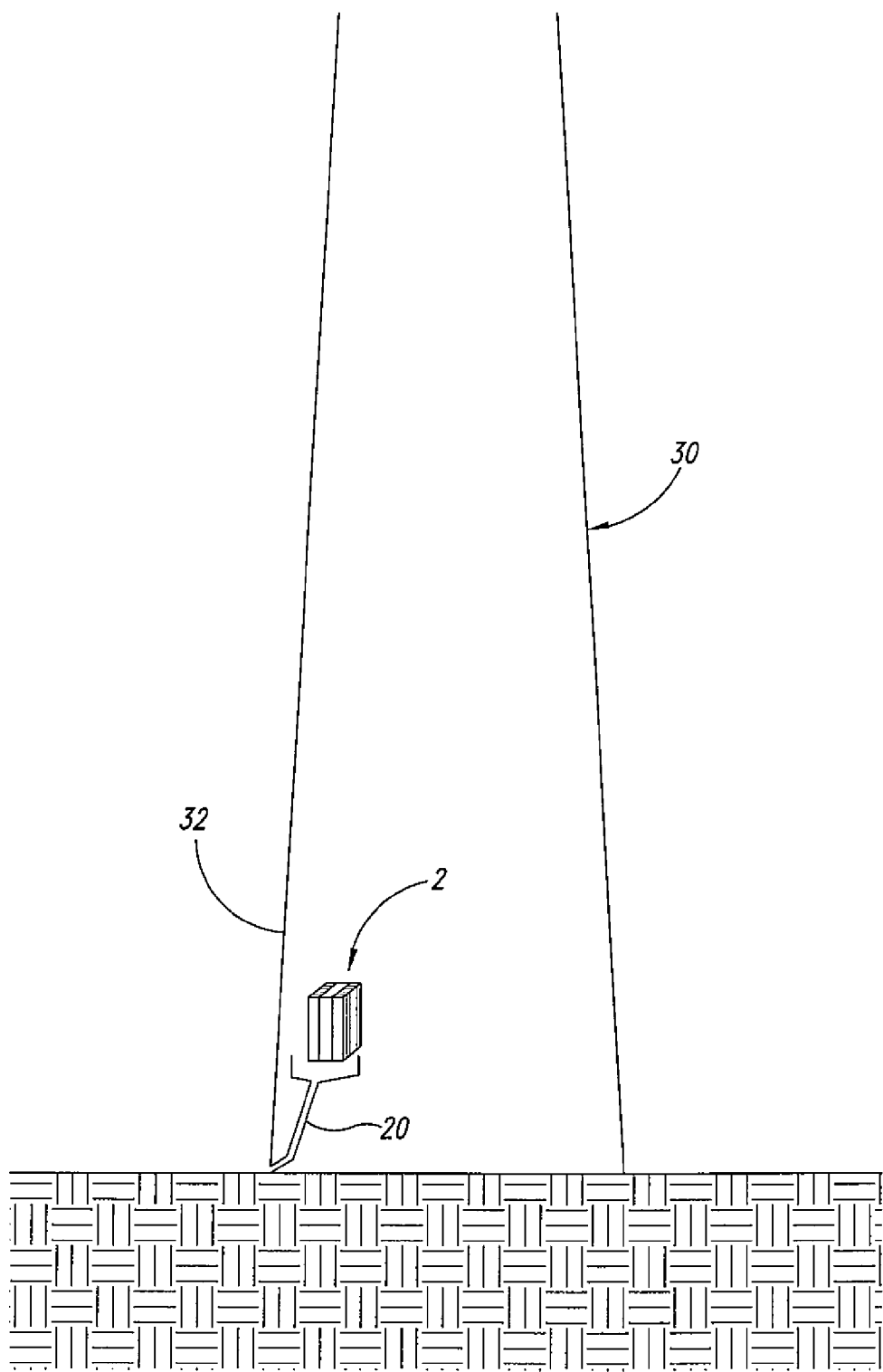
FIG. 3 shows an arrangement of an apparatus according to the invention in the pylon of a wind power installation.

FIG. 3 shows a partial view of a pylon 30 of a wind power installation. The apparatus according to the invention which in FIG. 3 is identified generally by reference numeral 2 is assumed to be arranged approximately at a halfway position on the height of the pylon 30. The duct 20 for draining off the condensate water is laid within the pylon 30 to a position close to the ground in FIG. 3 and only there issues outwardly through the wall 32 of the pylon 30. In one embodiment, the second element 14 which receives the heat in directly coupled to the wall 32 of the pylon 30, or in one case, is composed of the wall 32 itself, so that a large heat sink mass is provided to assist in the cooling element 10 to become very cool easily and without having to heat the element 14 itself to a high temperature. Namely, the mass of element 14 for receiving the heat which is removed from the cooling element 10 can be very large so that the element 10 can easily become very cool and not cause a corresponding temperature rise in the element 14 which receives the heat. That reliably prevents traces of water on the outside of the wall 32.

The preferred position of installation of the dehumidifier according to the invention is in the region of the base of the tower, but installation at other locations on the wind power installation is also possible. The region of the base of the tower has the advantage that air which has already been dehumidified will pass through the rectifiers which are usually arranged in the base of the tower.

A further advantageous possible way of draining off the condensate water from the tower is in the region of the access door. The door is fitted in any case as a separate component element into the lower section of the pylon. It is possible in that way to avoid a change in structure which is essential when making an opening through the wall of the pylon.

Figure 4:
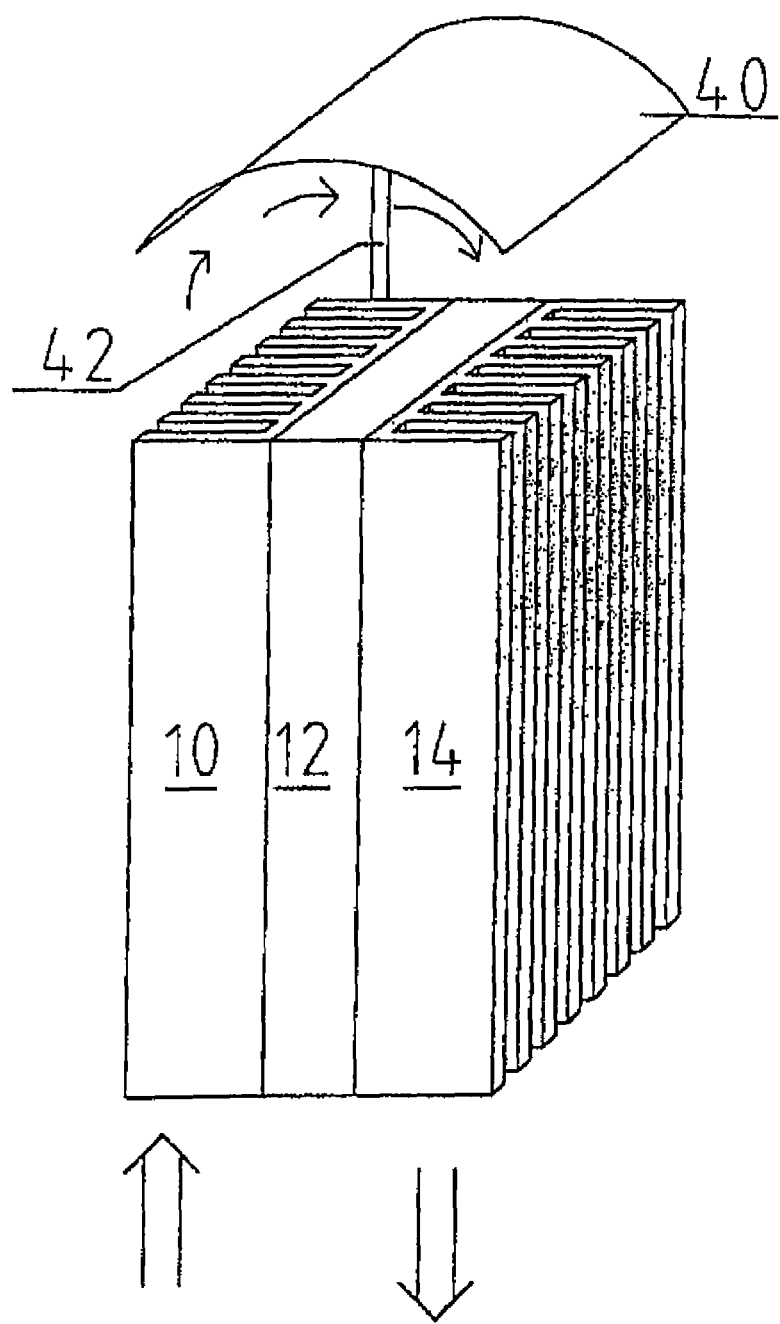
FIG. 4 shows a perspective view of an apparatus according to the invention.

FIG. 4 shows a modified representation of FIG. 1. The difference in relation to FIG. 1 essentially lies in a baffle plate 40 which is arranged above the cooling body (first and second element) 10, 14 and which deflects cooled air which is guided along the first (cooling) element by a fan. That cooled air is deflected on to the second (warm) element 14 by the baffle plate 40 and cools the second element. In that arrangement the baffle plate 40 is held in a predetermined position by supports 42. For the sake of clarity of the drawing only one support 42 is illustrated, but of course others support will be provided as needed.

Accordingly, heat is extracted at the first element 10 from the air flowing therepast, and that heat is transported to the second element 14 by the cooling device, usually a Peltier element 12. The baffle plate 40 deflects the cooled air to the second element 14 and there the air picks up again the heat previously extracted from it. In that way the fan power required for cooling the second element 14 and thus the power consumption of the apparatus can be reduced.

As described, the function of the cooling device, such as for example the Peltier element, is therefore as a primary matter not cooling of the air within the wind power installation but solely dehumidification of the interior of the installation, for which reason also the cooled air is deflected from one side of the cooling device to the other and is then equally warmed again and the temperature in the installation is thus scarcely affected.

Figure 5:
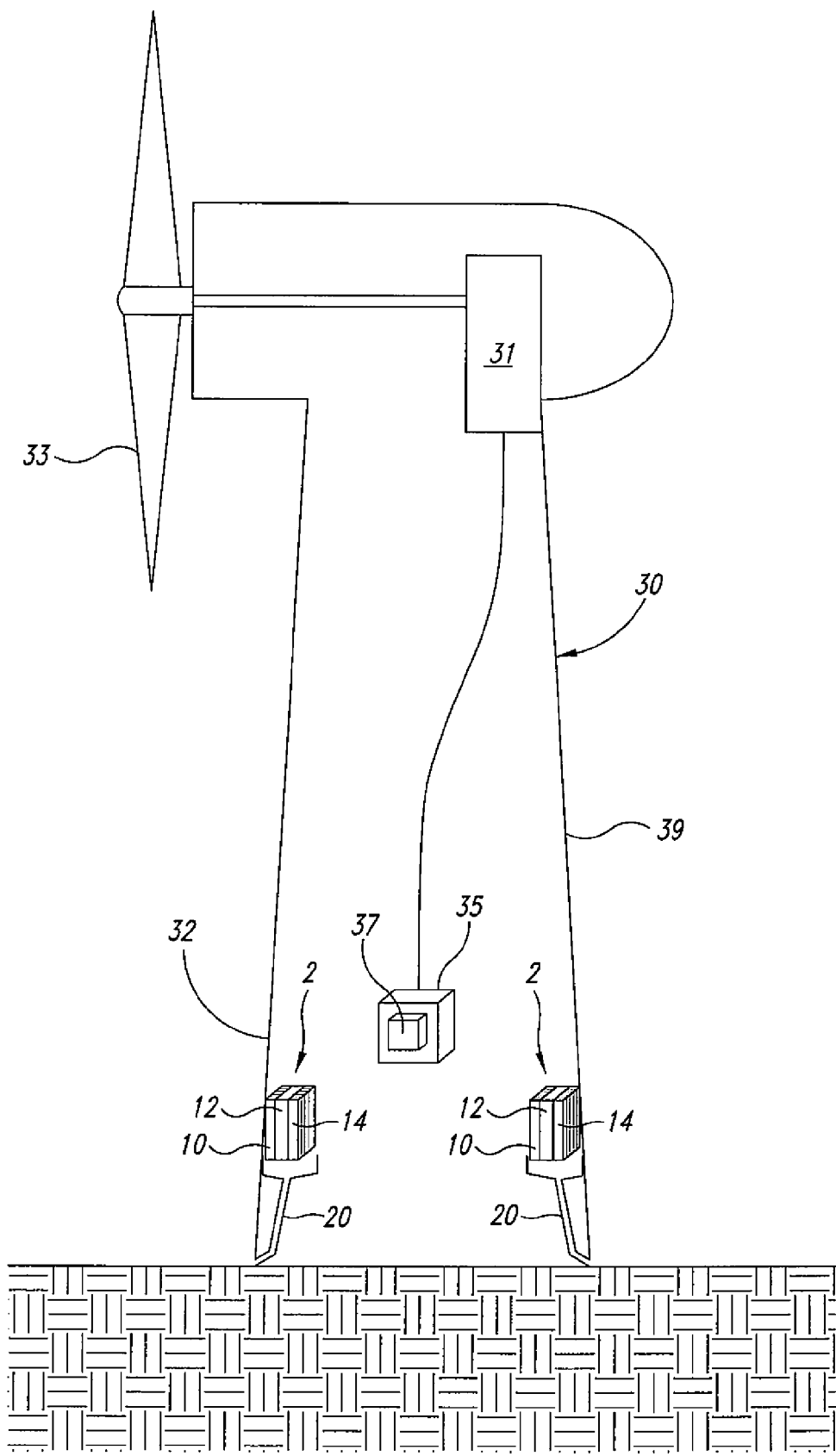
FIG. 5 shows a side view of a wind power installation according to one embodiment.

Furthermore, in one embodiment as illustrated in FIG. 5, a wind power installation includes a generator 31 and at least two rotor blades 33 coupled to the generator 31. The rotor blades 33 are exposed to wind to generate electrical power from the wind. The wind power installation further includes a pylon 30 supporting the generator 31. The pylon 30 includes an internal space, which houses electrical equipment 35 configured to receive electrical power generated by the generator 31. The electrical equipment 35 may include a rectifier 37.

Furthermore, a dehumidification device 2 according to embodiments discussed herein or other embodiments within the scope of the present disclosure, is positioned at least partially within the internal space of the pylon 30 adjacent the electrical equipment 35 to reduce a water content of ambient air surrounding the electrical equipment 35 below a water content of ambient air of a surrounding environment external to the pylon 30. The dehumidification device 2 includes a first element 10 positioned within the internal space of the pylon 30, a heat transfer element 12 coupled to the first element 10 and configured to remove heat from the first element 10.

Figure 6:
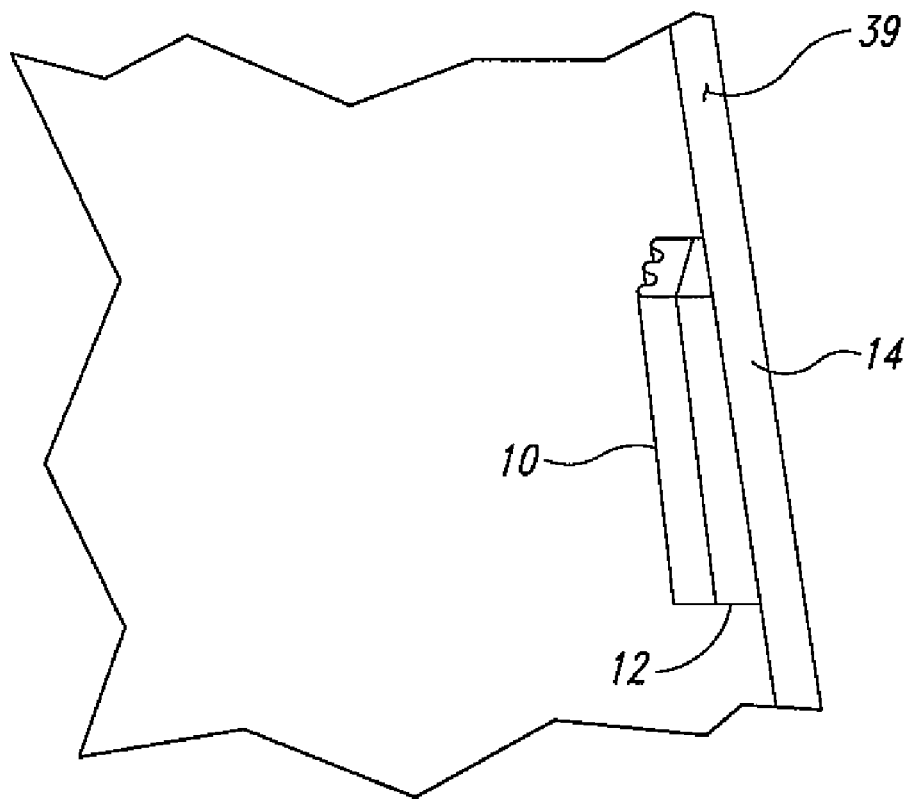
FIG. 6 shows a portion of the wind power installation of FIG. 5 according to one embodiment.

At least one dehumidification device 2 further includes a second element 14 coupled to the heat transfer element 12 and also to a wall 39 of the pylon 30. The second element 14 is configured to receive the heat removed from the first element 10. As shown in FIG. 6, in one embodiment, the wall 39 of the pylon 30 can form at least in part, the second element 14.

The invention claimed is:

1. An apparatus comprising:
   a generator;
   at least two rotor blades coupled to the generator, the rotor blades being exposed to wind to generate electrical power from the wind;
   a pylon supporting the generator, the pylon having an internal space;
   electrical equipment configured to receive electrical power generated by the generator, the electrical equipment being located within the internal space of the pylon;
   a dehumidification device at least partially positioned within the internal space of the pylon to reduce a water content of ambient air surrounding the electrical equipment below a water content of ambient air of a surrounding environment external to the pylon, the dehumidification device including a first element positioned within the internal space of the pylon, a heat transfer element coupled to the first element and configured to remove heat from the first element, and a second element coupled to the heat transfer element and to a wall of the pylon, the second element being configured to receive the heat removed from the first element; and means for collecting and removing the water content extracted from the ambient air in the internal space of the pylon to a surrounding environment external with respect to the pylon.

2. The apparatus of claim 1 wherein the wall to which the second element is coupled supports the generator.

3. The apparatus of claim 1 wherein at least a portion of the second element is formed by a portion of a wall of the pylon supporting the generator.

4. The apparatus of claim 1 wherein the heat transfer device is interposed between the first element and the second element, connecting the first and second elements to each other.

5. The apparatus of claim 1 wherein the heat transfer element includes at least one Peltier element.

6. The apparatus of claim 1 wherein the means for collecting and removing includes at least one of a catch unit and a sensor operable to communicate collection of the water content beyond a particular volume.

7. The apparatus of claim 1 wherein the water content is received by the first element and communicated to the means for collecting and removing.

8. The apparatus of claim 1, further comprising:
a first sensor configured to detect a temperature of the first element;
a second sensor configured to detect ambient temperature; and
a control device electrically coupled to the first and second sensors, the control device being configured to receive temperature data from the first and second sensors and process the data to set the temperature of the first element.

9. The apparatus of claim 8 wherein the control device is configured to vary power supplied to the heat transfer element to set the temperature of the first element.

10. The apparatus of claim 8 wherein the control device is configured to set the temperature of the first element below ambient temperature.

11. The apparatus of claim 1 wherein at least one of the first and second elements includes a plurality of ribs configured to maximize an exposed area thereof.

12. The apparatus of claim 1 wherein the electrical equipment includes a rectifier.

13. The apparatus of claim 1 wherein the dehumidification device is positioned adjacent the electrical equipment.

14. An apparatus comprising:
a generator;
at least two rotor blades coupled to the generator, the rotor blades being exposed to wind to generate electrical power from the wind;
a pylon supporting the generator, the pylon having an internal space;
electrical equipment configured to receive electrical power generated by the generator, the electrical equipment being located within an internal space of the pylon;
a dehumidification device at least partially positioned within the internal space of the pylon adjacent the electrical equipment to reduce a water content of ambient air surrounding the electrical equipment below a water content of ambient air of a surrounding environment external to the pylon, the dehumidification device including a first element positioned within the internal space of the pylon, a heat transfer element coupled to the first element and configured to remove heat from the first element, and a second element coupled to the heat transfer element, the second element being configured to receive the heat removed from the first element; and
a deflecting structure coupled to a portion of the dehumidification device and configured to deflect cooled air surrounding the first element or the heat transfer element, toward the second element for extracting the heat received by the second element.

15. The apparatus of claim 14, further comprising:
a fan positioned adjacent the first element or the heat transfer element and configured to facilitate direction of the cooled air toward the deflecting structure and the deflection of the cooled air toward the second element.

16. The apparatus of claim 14 wherein the second element is coupled to a wall of the pylon.

17. The apparatus of claim 14 wherein the second element is formed at least in part by a portion of a wall of the pylon.

18. The apparatus of claim 17 wherein the wall of the pylon forming at least in part the second element supports the generator.

19. The apparatus of claim 14, further comprising:
means for collecting and removing the water content extracted from the ambient air in the internal space of the pylon, to a surrounding environment external with respect to the pylon, the means for collecting and removing including a catch unit for collecting the water content.

20. The apparatus of claim 19, further comprising:
a sensor operable to communicate collection of the water content beyond a particular volume.

21. The apparatus of claim 14 wherein at least one of the first and second elements includes a plurality of ribs configured to maximize an exposed area thereof.

* * * * *